US012635596B2

(12) United States Patent
Radding et al.

(10) Patent No.: US 12,635,596 B2
(45) Date of Patent: May 26, 2026

(54) SYSTEMS FOR SECURING FLORA FRAGMENTS TO AN SUB-AQUATIC SUBSTRATE AND METHODS RELATED THERETO

(71) Applicant: REEFGEN, INC., San Francisco, CA (US)

(72) Inventors: Zachary Radding, San Francisco, CA (US); Abhimanyu Belani, San Francisco, CA (US); Jonathan Pompa, Long Beach, CA (US); Madeline Pomicter, San Francisco, CA (US); David Solomon, San Francisco, CA (US)

(73) Assignee: REEFGEN, INC.

( * ) Notice: Subject to any disclaimer, the term of this patent is extended or adjusted under 35 U.S.C. 154(b) by 526 days.

(21) Appl. No.: 18/211,306

(22) Filed: Jun. 19, 2023

(65) Prior Publication Data

US 2024/0114822 A1      Apr. 11, 2024

Related U.S. Application Data

(60) Provisional application No. 63/353,648, filed on Jun. 20, 2022.

(51) Int. Cl.
 *A01C 11/00*      (2006.01)
 *A01C 5/04*      (2006.01)

(52) U.S. Cl.
 CPC .............. *A01C 11/003* (2013.01); *A01C 5/04* (2013.01)

(58) Field of Classification Search
 CPC ..... A01C 11/00; A01C 11/003; A01C 11/006; A01C 11/02; A01C 11/04; A01C 11/025
 USPC ..................................................... 111/91, 114
 See application file for complete search history.

(56) References Cited

U.S. PATENT DOCUMENTS

| | | | | | |
|---|---|---|---|---|---|
| 3,155,058 A | * | 11/1964 | Valdi | .................... | A01C 11/003 111/911 |
| 3,648,464 A | * | 3/1972 | Edwards | .............. | A01C 11/003 405/24 |
| 4,111,135 A | * | 9/1978 | Braun | .................... | A01C 11/02 111/91 |
| 4,644,880 A | * | 2/1987 | Branch | ................ | A01C 11/025 111/105 |
| 6,718,890 B1 | * | 4/2004 | Traber | .................... | A01C 7/008 111/901 |
| 8,763,302 B2 | * | 7/2014 | Morse | .................... | A01G 9/081 111/104 |
| 2008/0005961 A1 | * | 1/2008 | Anderson | ................ | A01G 9/00 47/74 |

* cited by examiner

*Primary Examiner* — Jamie L McGowan

(74) *Attorney, Agent, or Firm* — EcoTech Law Group, P.C.

(57) ABSTRACT

A seagrass planting system that includes a planting spike. The planting spike includes: a tine end feature having a converging portion and a base portion having disposed thereon a seagrass securing mechanism for securing a seagrass segment; an alignment guide feature extending from the base portion, spanning from a first end to second end, and including a first alignment edge and a second alignment edge disposed on an area located between the first end and the second end; and force receiving feature extending at an angle relative to the second end.

20 Claims, 7 Drawing Sheets

700

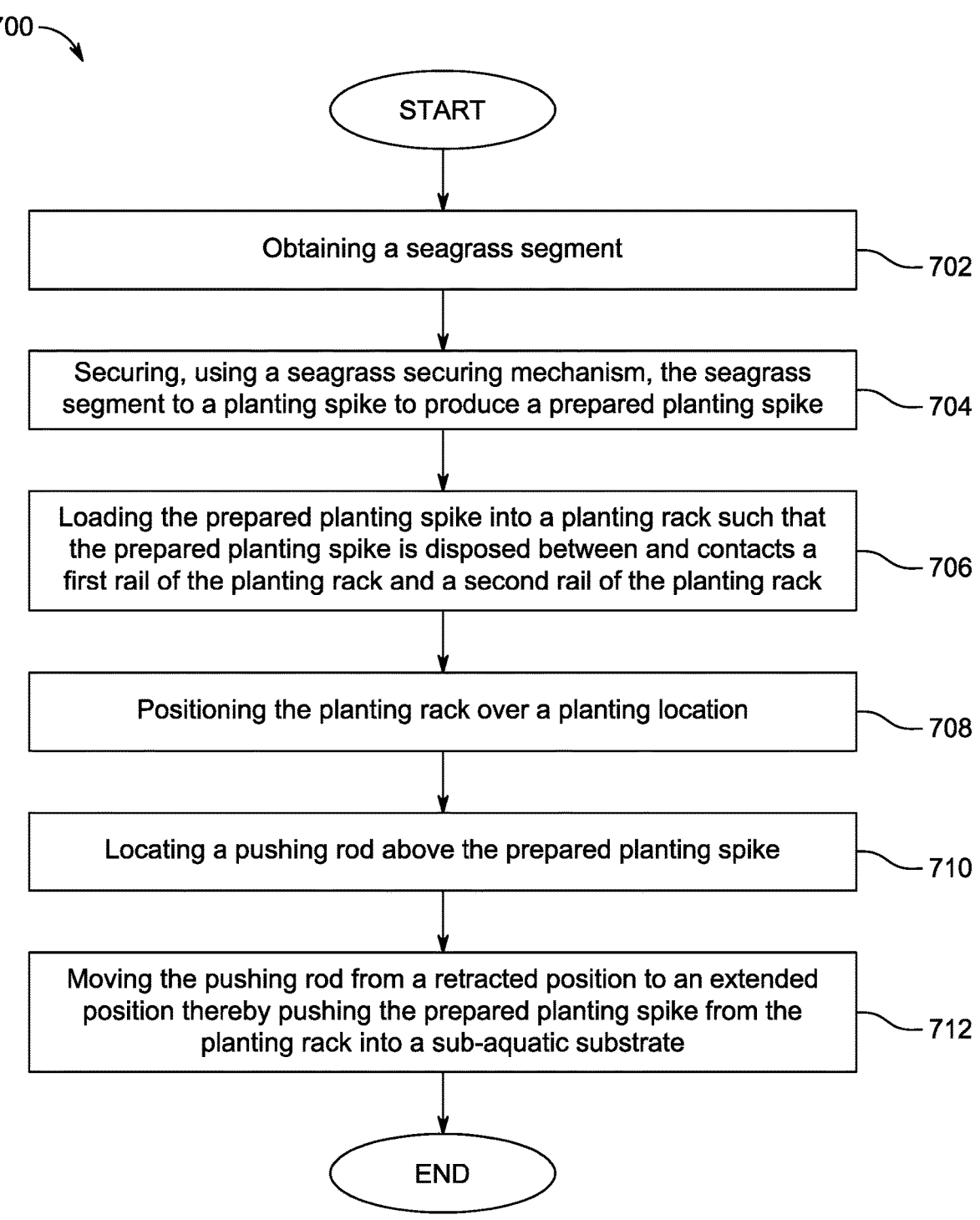

START

Obtaining a seagrass segment ⸺ 702

Securing, using a seagrass securing mechanism, the seagrass segment to a planting spike to produce a prepared planting spike ⸺ 704

Loading the prepared planting spike into a planting rack such that the prepared planting spike is disposed between and contacts a first rail of the planting rack and a second rail of the planting rack ⸺ 706

Positioning the planting rack over a planting location ⸺ 708

Locating a pushing rod above the prepared planting spike ⸺ 710

Moving the pushing rod from a retracted position to an extended position thereby pushing the prepared planting spike from the planting rack into a sub-aquatic substrate ⸺ 712

END

Figure 7

SYSTEMS FOR SECURING FLORA FRAGMENTS TO AN SUB-AQUATIC SUBSTRATE AND METHODS RELATED THERETO

RELATED APPLICATION

This application claims priority from U.S. provisional application having Ser. No. 63/353,648, filed on Jun. 20, 2022, which is incorporated by reference for all purposes.

FIELD

The present teachings generally relate to novel systems and methods for planting or attaching flora segments (e.g., seagrass segments) to an underwater or sub-aquatic substrate (e.g., seafloor). More particularly, the present teachings relate to inexpensive and easy-to-operate autonomous or semi-autonomous systems and methods for planting or attaching flora segments to sub-aquatic substrates.

BACKGROUND

Sub-aquatic flora habitats (e.g., seagrass colonies or seagrass meadows) are rapidly disappearing due to, for example, pollutants, changes in climate, increasing water temperature, and changes in water composition. Regenerating or regrowing flora habitats, by planting new fauna segments, however, is slow, difficult, and expensive.

What is needed, therefore, are systems and methods to regenerate or regrow flora habitats in a quick, easy, and cost-effective manner.

SUMMARY

To this end, the present arrangements and teachings provide improved systems for securing flora segments (hereinafter referred to as "seagrass segments") to an underwater or sub-aquatic substrate and methods related thereto.

In one aspect, the present arrangements provide a seagrass planting system that includes a planting spike. The planting spike includes a tine end feature, an alignment guide feature, and a force receiving feature. The tine end feature includes a converging portion and a base portion. A seagrass securing mechanism is disposed on the base portion to secure a seagrass segment to the planting spike. The converging portion is designed to penetrate a sub-aquatic substrate.

The alignment guide feature, which extends an extending distance away from the base portion, spans from a first end to a second. A first alignment edge and a second alignment edge disposed on an area located between the first end and the second end. The first alignment edge and the second alignment edge are designed to align the planting spike within a planting rack.

The force receiving feature extends at an angle relative to the second end and is designed to receive a pushing force to push the planting spike from the planting rack into the sub-aquatic substrate.

In one embodiment of the present arrangements, the seagrass securing mechanism includes one or more securing tangs that extend away from the base portion. When a seagrass segment is disposed between each of the securing tangs and the base portion and each of the securing tangs is bent towards the base portion, the seagrass segment is secured to the securing tang.

In another embodiment of the present arrangements, the seagrass securing mechanism includes a first extending arm, extending from a first base portion side, a second extending arm, extending from a second base portion side, a first banding element, and a second banding element. The first banding element is wrapped around the first extending arm to secure a portion of the seagrass segment to the first extending arm. The second banding element is wrapped around the second extending arm to secure another portion of the seagrass segment to the second extending arm.

The alignment guide feature, in one embodiment of the present arrangements, is substantially parallel with the tine end feature and the extending distance between the base portion and the first end ranges from between about 1 mm to about 10 mm.

The planting spike, in one embodiment of the present arrangements, is produced from a single piece of material. In another embodiment of the present arrangements, the planting spike is made from a material that corrodes when the material is exposed to saltwater. By way of example, the planting spike material is selected from at least one material selected from a group including biodegradable plastic, steel, aluminum, plants, plastic, and fungi.

The force receiving feature, in one embodiment of the present arrangements, extends ninety degrees relative to the second end. Thus, the force receiving end is perpendicular to the alignment guide feature. The force receiving feature, in another embodiment of the present arrangements, includes a first engaging end and a second engaging end.

In addition to the planting spike, the seagrass planting system, in one embodiment of the present arrangements, further includes one or more planting racks. Each of the planting racks further includes a first rail and a second rail and one or more of the planting spikes may be held between the first and second rail. Each of the planting racks, in on embodiment of the present arrangements, is parallel to an adjacent planting rack.

The first rail includes one or more first rail slots and a first rail recession. Each first rail slot extends from an internal first rail sidewall into the first rail and extends from a first rail top surface to a first rail bottom surface. The first rail recession is proximate to the first rail top surface and extends from a first rail end to a second rail end.

The second rail includes one or more second rail slots and a second rail recession. Each second rail slot extends from an internal second rail sidewall into the second rail and extends from a second rail top surface to a second rail bottom surface. The second rail recession is proximate to the second rail top surface and extends from a first rail end to a second rail end. Each the first rail slots are aligned with and parallel to a corresponding second rail slot and the second rail recession is aligned with and parallel to the first rail recession.

When the planting spike is installed within the planting rack, the first alignment edge of the planting spike is disposed within one of the first rail slots and the second alignment edge is disposed within a corresponding second rail slot to inhibit or reduce lateral movement of the planting spike within the rack. The first engaging end of the planting spike is disposed within the first rail recession and a second engaging end of the planting spike is disposed within the corresponding second rail recession to inhibit or reduce movement of the planting spike in a vertical or longitudinal direction.

In one embodiment of the present arrangements, a width of the force receiving feature, between the first engaging end and the second engaging end, is greater than a width between the internal first rail sidewall and the internal second rail sidewall.

The seagrass planting system, in one embodiment of the present arrangements, further includes a pushing rod that moves between a retracted position and an extended position (i.e., along a z-axis). When the pushing rod is located above the planting spike and moves from the retracted position to the extended position, the pushing rod contacts the force receiving feature of the planting spike and pushes at least a portion of the planting spike into the sub-aquatic substrate.

To enable movement from the retracted position to the extended position, the seagrass planting system, in one embodiment of the present arrangements, further includes a first longitudinal rod, a second longitudinal rod, and a longitudinal linear actuator. The first longitudinal rod and the second longitudinal rod are coupled to and parallel with the pushing rod. The longitudinal actuator, coupled to the first longitudinal rod and/or the second longitudinal rod, induces the first longitudinal rod and the second longitudinal rod to move longitudinally or vertically, such that the pushing rod moves between the retracted position and the extended position.

The longitudinal linear actuator, in one embodiment of the present arrangements, includes a motor, a lateral belt pulley having teeth defined around a circumference of the longitudinal belt pulley, and a belt having a belt teeth pattern that matches the teeth of the longitudinal belt pulley. The motor is coupled to the longitudinal belt pulley and the longitudinal belt pulley is engaged with the belt extending from a first rod end to a second rod end of the first longitudinal rod and/or the second longitudinal rod. When motor induces the longitudinal belt pulley to rotate, the teeth of the belt pulley engage with the belt teeth pattern causing the first longitudinal rod and the second longitudinal rod to move longitudinally or vertically thereby causing the pushing rod to move between the retracted position and the extended position.

The seagrass planting system, in one embodiment of the present arrangements, further includes a first lateral rod, a second lateral rod, and a lateral linear actuator. The first lateral rod and the second lateral rod are coupled to but perpendicular to the pushing rod. Moreover, the first lateral rod and the second lateral rod are parallel to one or more of the planting racks.

The lateral linear actuator is coupled to the first lateral rod and/or the second lateral rod and induces the first lateral rod and the second lateral rod to move laterally or horizontally (i.e., along an x-axis), such that the pushing rod moves laterally or horizontally along a length of the planting rack.

The seagrass planting system, in one embodiment of the present arrangements, further includes a third horizontal rail, a fourth horizontal rail, and second lateral linear actuator. The third lateral rod and the fourth lateral rod are coupled to the pushing rod and perpendicular to one or more of the planting racks.

The second lateral linear actuator is coupled to the third lateral rod and/or the fourth lateral rod to induce the pushing rod to move horizontally along at least a portion of a length of the third lateral rod and/or the fourth lateral rod. Thus, the pushing rod moves from above one of the planting racks to another of the planting racks (i.e., along a y-axis).

In another aspect, the present teachings also provide a method for planting a seagrass segment. In one implementation of the present teachings, the method includes: (i) obtaining a seagrass segment; (ii) securing, using a seagrass securing mechanism, the seagrass segment to a planting spike to produce a prepared planting spike; (iii) loading the prepared planting spike into a planting rack such that the prepared planting spike is disposed between and contacts a first rail of the planting rack and a second rail of the planting rack; (iv) positioning the planting rack over a planting location; (v) locating a pushing rod above the prepared planting spike; and (v) moving the pushing rod from a retracted position to an extended position thereby pushing the prepared planting spike from the planting rack into a sub-aquatic substrate.

The method of planting the seagrass segment, in one embodiment of the present teachings, loading the prepared planting spike into the planting rack further includes: (a) positioning a first alignment edge of the planting spike within a first rail slot of a first rail and a second alignment of the planting spike within a second rail slot of a second rail; (b) and positioning a first engaging end of the planting spike within a first rail recession of the first rail and a second engaging end of the planting spike within a second rail recession of the second rail.

The method of planting the seagrass segment, in another embodiment of the present teachings, further includes securing one or more planting racks to a sub-aquatic vehicle.

The step of locating the pushing rod above the prepared planting spike includes moving the pushing rod from above one of the planting racks to above another of the planting racks.

The construction and method of operation of the arrangements and teachings, however, together with additional objects and advantages thereof, will be best understood from the following descriptions of specific embodiments when read in connection with the accompanying figures.

BRIEF DESCRIPTION OF THE DRAWINGS

FIG. 7 shows a process flow diagram of a method, according to one embodiment of the present arrangements, of planting a seagrass segment.

Figure 1:
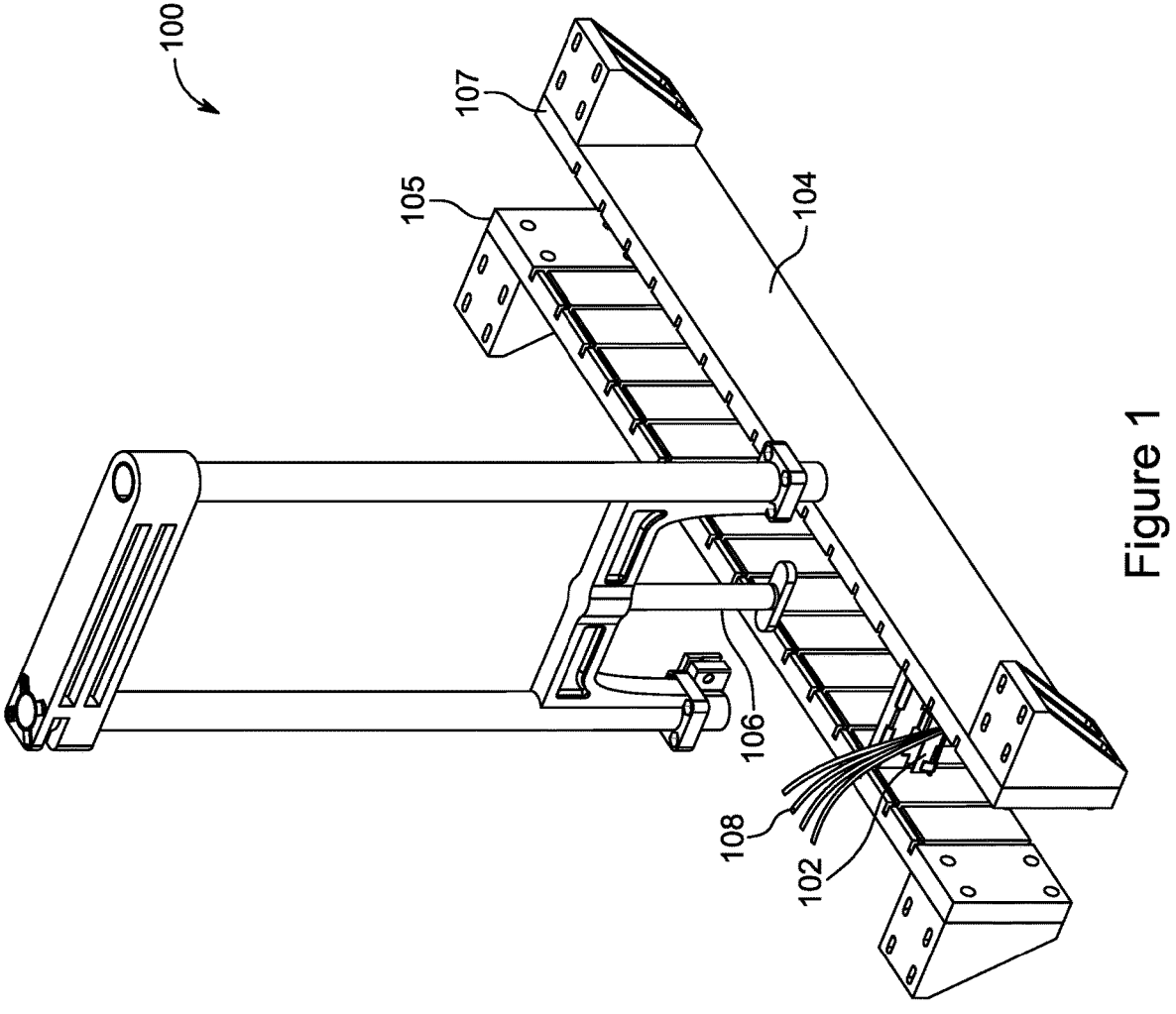
FIG. 1 shows a perspective view of a seagrass planting system, according to one embodiment of the present arrangements, and that includes a planting spike, a planting rack that includes a first rail and a second rail, and a pushing rod for pushing the planting spike from the planting rack into a sub-aquatic substrate.

DETAILED DESCRIPTION OF THE
EMBODIMENTS

In the following description, numerous specific details are set forth in order to provide a thorough understanding of the present teachings and arrangements. It will be apparent, however, to one skilled in the art that the present teachings and arrangements may be practiced without limitation to some or all of these specific details. In other instances, well-known process steps have not been described in detail in order to not unnecessarily obscure the present teachings and arrangements.

Seagrasses provide important ecosystems and habitats for thousands of aquatic and land-based organisms. Seagrass environments (e.g., seagrass colonies or meadows), which can be found worldwide, occupy only about 0.1% to about 0.2% of the ocean but provide critical habitat for marine life living within this small zone. In addition to the unique biodiversity within seagrass habitats, they protect coastlines by absorbing wave energy, thus preventing erosion, and reducing damage caused by storms, hurricanes, and cyclones. Moreover, these seagrass habitats provide vital food and economic resources to humans around the world as well as a vital means of carbon and nutrient sequestration. Unfortunately, however, this critical habitat is rapidly disappearing due to, for example, pollutants, changes in climate, increasing water temperature, and changes in water composition. What is needed, therefore, are systems and methods to regenerate or regrow seagrass in a quick, inexpensive, and cost-effective manner.

Generally, seagrasses are flowering plants that live in submerged or periodically submerged aquatic environments. There are at least seventy species of seagrasses with various physical structures, but all include rhizomes that extend horizontally under the sub-aquatic substrate and produce a root structure and/or leaf structure from one or more nodes. The roots are embedded in the substrate and the leaves extend above the substrate.

Seagrasses can be moved between locations and reestablish growth if properly handled. By way of example, seagrasses for transplant can be taken from existing natural beds, farmed beds in-situ underwater, or other types of nurseries such as land-based aquaculture facilities. As will be discussed in greater detail below, a seagrass segment for planting includes at least a horizontal rhizome segment having a node from which a leaf structure is already growing or will grow.

To this end, the present arrangements and teachings provide novel systems and methods for planting seagrass segments directly into the substrate. Once the seagrass segment is secured to the substrate, the seagrass will grow within the substrate, produce one or more leaves, and, eventually, spread. In other words, once the seagrass segment is planted into the sub-aquatic substrate, the rhizome portion of the seagrass segment will continue to grow horizontally within the substrate producing new nodes, from which additional roots and/or leaves will grow.

FIG. 1 shows a seagrass planting system 100, according to one embodiment of the present arrangements, for planting one or more seagrass segments directly into a substrate. Seagrass planting system 100 includes a planting spike 102, a planting rack 104, and a pushing rod 106 for plantings a seagrass segment 108 into a sub-aquatic substrate. Planting rack 104 includes a first rail 105 and a parallel second rail 107. As discussed in greater detail below, to enable the planting of seagrass segment 108 into the sub-aquatic substrate, seagrass segment 108 is coupled to planting spike 102. One or more planting spikes 102 are capable of being loaded into planting rack 104, between first rail 015 and second rail 107, to facilitate planting numerous seagrass segments quickly and efficiently. At a desired planting location, pushing rod 106 pushes planting spike 102, from planting rack 104, into the sub-aquatic substrate.

Seagrass planting system 100 may be coupled to a sub-aquatic planter such as a sled and towed by a vehicle (e.g., a boat) or secured to a tethered or untethered remotely operated vehicle ("ROV"). By moving the vehicle or ROV, the seagrass segments may be planted at spaced intervals along the sub-aquatic substrate. Thus, seagrass planting system 100 enables multiple seagrass segments to be quickly and easily planted into the sub-aquatic substrate.

Figure 2:
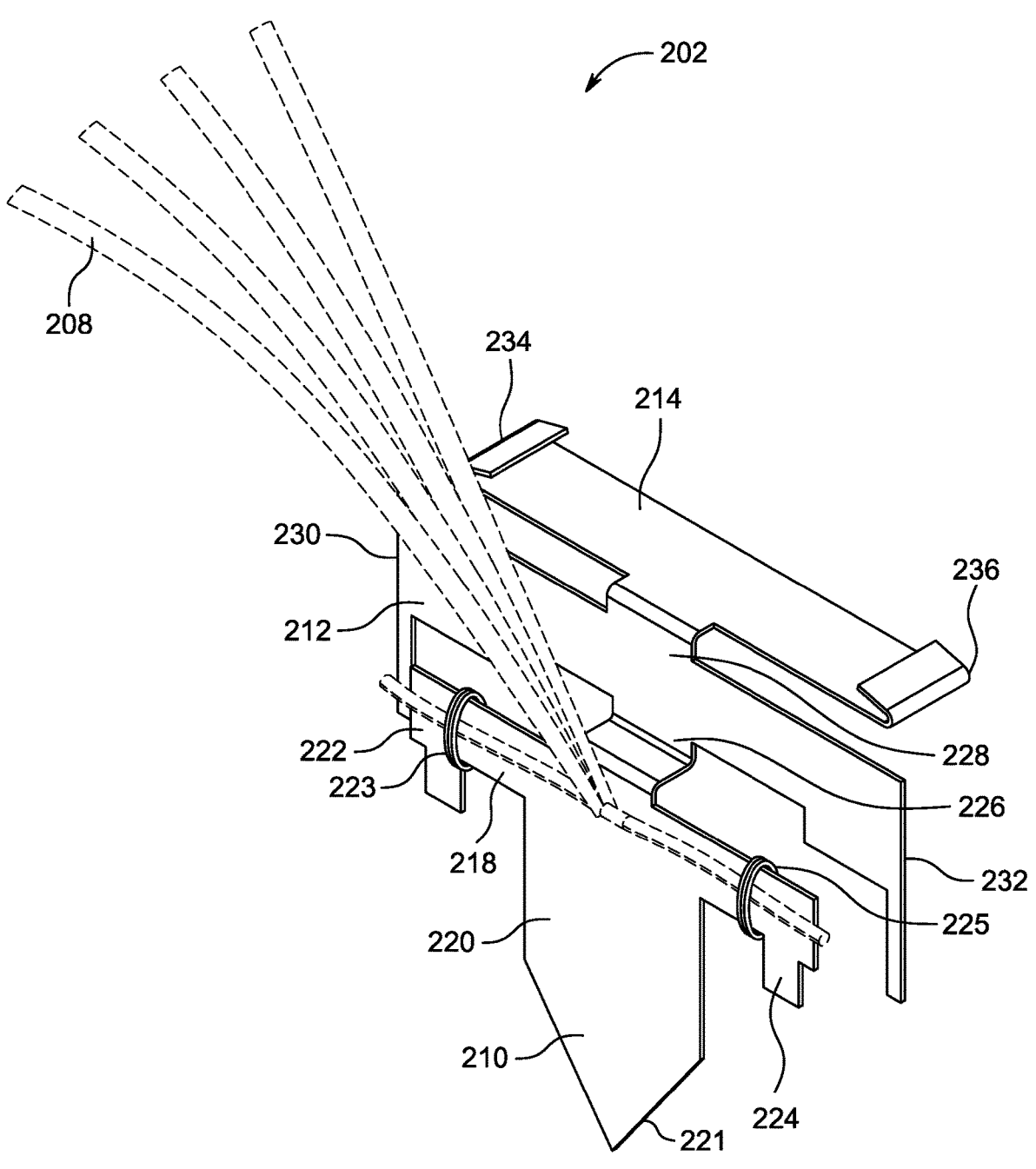
FIG. 2 shows a perspective view of the planting spike of FIG. 1, according to one embodiment of the present arrangements, having a seagrass securing mechanism that includes a first extending arm and second extending arm for securing a seagrass segment onto the planting spike.

FIG. 2 shows a planting spike 202, according to one embodiment of the present arrangements, that includes a tine end feature 210, an alignment guide feature 212, a force receiving feature 214, and a seagrass securing mechanism 218. Planting spike 202 is substantially similar to planting spike 102 of FIG. 1. Tine end feature 210 includes a base portion 220 and a converging portion 221. Converging portion 221 includes one or more surfaces or edges that converge or narrow to form, for example, a penetrating point. Seagrass securing mechanism 218, which is disposed on base portion 220, secures a seagrass segment 208 to base portion 220.

In planting a seagrass segment 208, tine end feature 210 is designed to be disposed within the sub-aquatic substrate such that seagrass segment 208, secured by seagrass securing mechanism 218, is positioned within the sub-aquatic substrate in a relatively horizontal position. The relatively horizontal position allows the rhizome of seagrass segment 208 to continue growing horizontally within the sub-aquatic substrate. In a preferred aspect of the present arrangements, base portion 220 is located above converging portion 221, such that when tine end feature 210 is disposed within the sub-aquatic substrate, seagrass segment 208 is proximate to the sub-aquatic substrate surface.

Seagrass securing mechanism 218 includes a first extending arm 222 that extends from a first base portion end, a second extending arm 224 that extends from an opposing base portion end, a first banding element 223, and a second banding element 225.

First banding element 223 wraps around first extending arm 222 to secure a section of seagrass segment 208 (e.g., a first rhizome segment of seagrass segment 208) in a relatively horizontal position and second banding element 225 wraps around second extending arm 224 to secure another section of seagrass segment 208 (e.g., a second rhizome segment of seagrass segment 208) in a relatively horizontal position.

Alignment guide feature 212, which extends from base portion 220, spans between a first end 226 and a second end 228. A first alignment edge 230 and a second alignment edge 232 are disposed on an area located between first end 226 and second end 228. In a preferred embodiment, first alignment edge 230 is substantially parallel to and located on an opposing edge as second alignment edge 232. As will be described in greater detail below, first alignment edge 230 and second alignment edge 232 align planting spike 102 within a planting rack (e.g., planting rack 104 of FIG. 1).

In one aspect of the present arrangements, alignment guide feature 212 is substantially parallel with tine end feature 210. In another aspect of the present arrangements, first end 226 extends an extending distance from base portion 220 such that tine end feature 210 is parallel to but not on the same plane as alignment guide feature 212. The extending distance keeps seagrass segment 208 away from force receiving feature 214 to minimize potentially harming seagrass segment 208 when a pushing rod contacts force receiving feature 214

The extending distance, measured horizontally between first end 226 and base portion 220, ranges from between about 0.1 mm to about 50 mm. In a preferred embodiment, the extending distance between first end 226 and base portion 220 ranges from between about 0.5 mm to about 3 mm. In a more preferred embedment of the present arrangements, the extending distance between first end 226 and base portion 220 ranges from between about 1 mm to about 10 mm.

Force receiving feature 214 extends at an extending angle from second end 228. In a preferred embodiment of the present arrangements, force receiving feature 214 extends ninety degrees from second end 228 such that force receiving feature 214 is perpendicular to alignment guide feature 212.

In another aspect of the present arrangements, force receiving feature includes a first engaging end 234 and a second engaging end 236. As discussed in greater detail below, when planting spike 202 is loaded into a planting rack (e.g., planting rack 104 of FIG. 1), first engaging end 234 and second engaging end 236 are designed to engage with a planting rack to inhibit or prevent vertical or longitudinal movement of planting spike 202.

In one embodiment of the present arrangements, planting spike 202 is produced from a single piece of material. By way of example, planting spike 202 is stamped from a material using a die and then bent to the shape described herein. By way of another example, planting spike is produced using a 3D printer. The present arrangements, however, are not so limited. A combination of two or more separate components may be combined to produce planting spike 202. In one embodiment of the present arrangements, planting spike 202 is made of a material that corrodes when exposed to saltwater and/or the sub-aquatic substrate. Planting spike 202 may be made from at least one material selected from a group comprising biodegradable plastic (i.e., plastic derived from plants), steel, aluminum, plants, and fungi.

Figure 3:
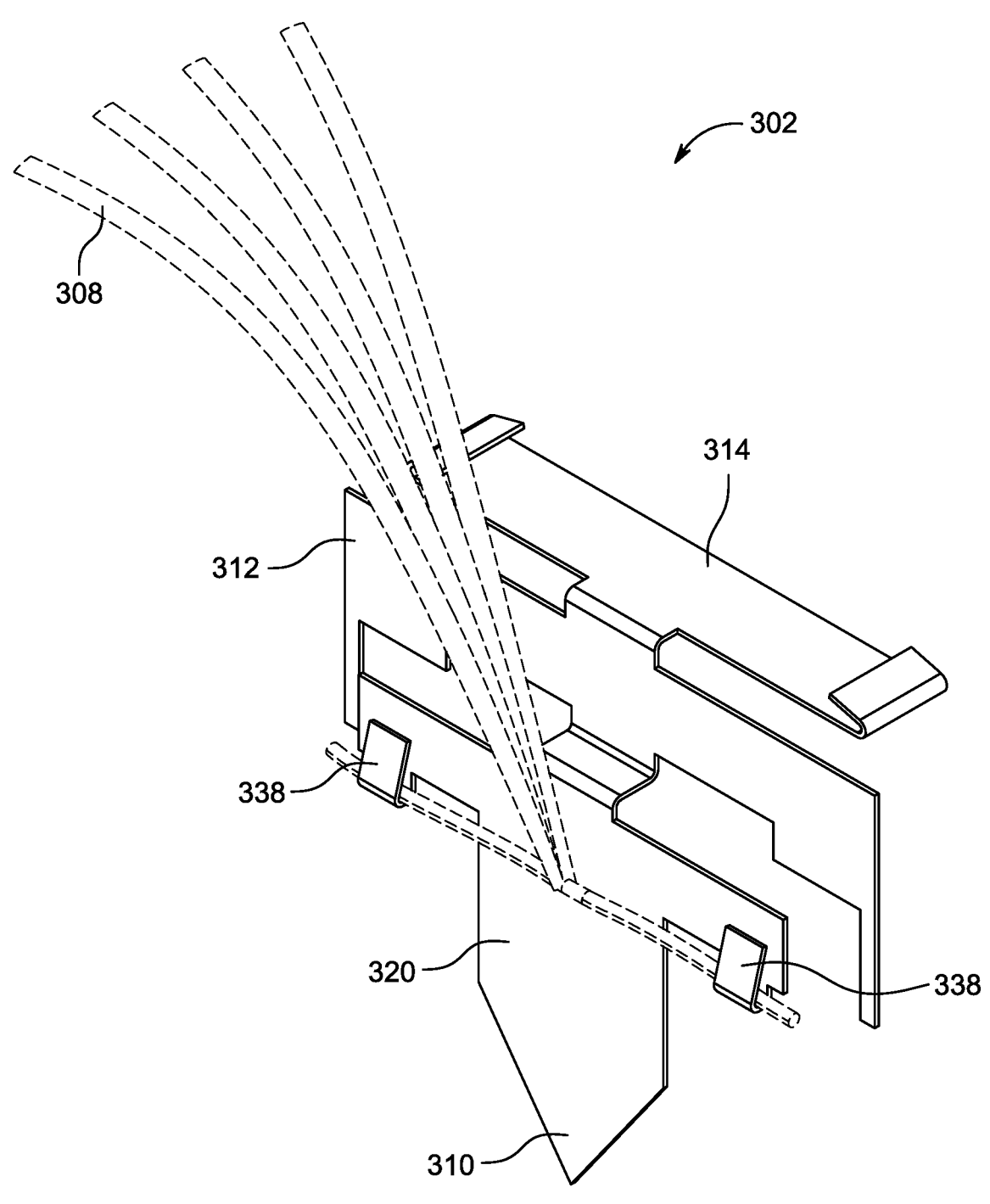
FIG. 3 shows a perspective view of the planting spike of FIG. 1, according to another embodiment of the present arrangements, having a seagrass securing mechanism that includes two securing tangs for securing a seagrass segment onto the planting spike.

FIG. 3 shows a planting spike 302, according to another embodiment of the present arrangements, that is substantially similar to planting spike 202 of FIG. 2. By way of example, planting spike 302 includes a tine end feature 310, an alignment guide feature 312, and a force receiving feature 314, which are substantially similar to their counterparts in planting spike 202 of FIG. 2 (i.e., tine end feature 210, alignment guide feature 212, and a force receiving feature 214). Planting spike 302, however, includes a seagrass securing mechanism 318 that is different from seagrass securing mechanism 218 of FIG. 2.

Seagrass securing mechanism 318 includes one or more securing tangs 338 that extend away from a base portion 320 of tine end feature 310. A seagrass segment 308 may be secured to planting spike 302 by placing a portion of seagrass segment 308 between securing tang 338 and base portion 320. In one embodiment of the present arrangements, a portion of each securing tang 338 (e.g., a securing tang tip) may be bent or deflected towards base portion 320 to enclose and secure seagrass segment 308 to base portion 320.

In another embodiment of the present arrangements, a spring force applied by one or more securing tangs 338 secures seagrass segment 308 between securing tang 338 and base portion 320. By way of example, a pulling force may be applied to a portion of securing tang 338 (e.g., a securing tang tip) to pull a portion of securing tang 338 from a securing tang neutral position and away from base portion 320. Seagrass segment 308 may be positioned between base portion 320 and securing tang 338. When the pulling force is removed, the spring force returns securing tang 338 to a neutral position and towards base portion 320, securing seagrass segment 308 between securing tang 338 and base portion 320.

Preferably, planting spike 302 includes two securing tangs 338 that are horizontally aligned along base portion 320. In this configuration, securing tangs 338 enable seagrass segments (e.g., seagrass rhizome segments) maintain a horizontal position when embedded in a sub-aquatic substrate.

Figure 4:
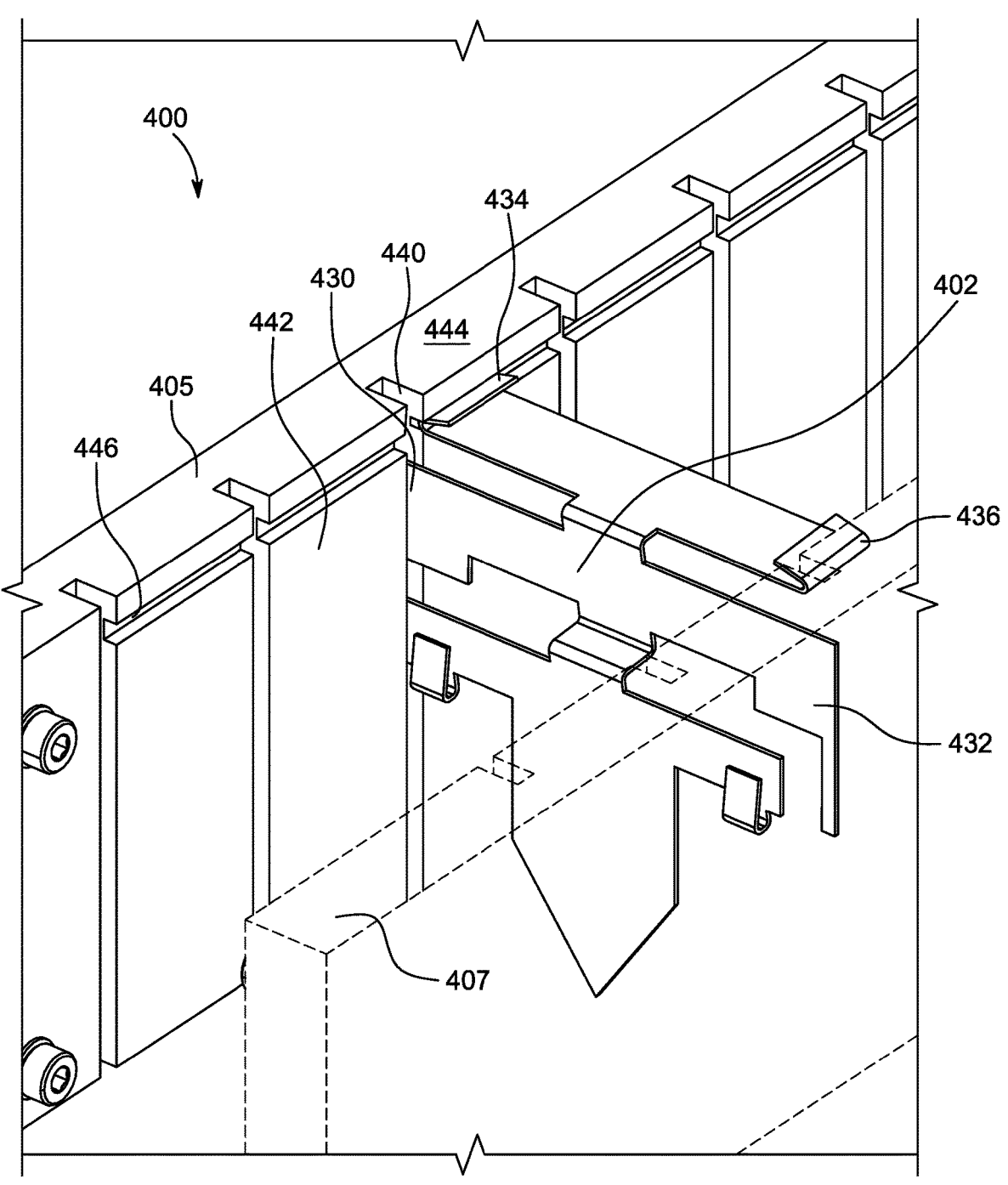
FIG. 4 shows a perspective view of the planting spike and the planting rack of FIG. 1, according to one embodiment of the present arrangements, wherein a first alignment feature of the planting rack is disposed within a first rail slot of the first rail and a first engaging end of the planting spike is disposed within a first rail recession of the first rail.

FIG. 4 shows a seagrass planting system 400, according to one embodiment of the present arrangements, which is substantially similar to seagrass planting system 100 of FIG. 1. Seagrass planting system 400 includes a planting spike 402, planting rack 404, a first rail 405, and a second rail 407, which are substantially similar to their counterparts in FIG. 1 (i.e., planting spike 102, planting rack 104, a first rail 105, and a second rail 107).

First rail 405 includes one or more first rail slots 440 and a first rail recession 446. Each first rail slot 440 recedes from an internal first rail sidewall 442 into first rail 405. Moreover, each first rail slot 440 extends along internal first rail sidewall 442 from a first rail top surface 444 to a first rail bottom surface. First rail recession 446 recedes from internal first rail sidewall 442 into first rail 405 and extends from a first rail end to a second rail end.

Second rail 407 includes one or more second rail slots and a second rail recession that is substantially similar one or more first rail slots and first rail recession, respectively. Each first rail slot 440 vertically aligns with a corresponding second rail slot and first rail recession 446 laterally aligns with the second rail recession.

As will be discussed in greater detail below, one or more planting spikes 402 may be loaded into planting rack 404, between first rail 405 and second rail 407. A first alignment edge 430 of planting spike 402 is disposed within first rail slot 440 and a second alignment edge 432 is disposed within the corresponding second rail slot of the second rail. When planting spike 402 is loaded into planting rack 404, first rail slot 440 and the second rail slot inhibit or prevent lateral or horizontal movement of planting spike 402 within planting rack 404. A first engaging end 434 of planting pike 402 is disposed within first rail recession 446 and second engaging end 436 is disposed within the second rail recession to inhibit or prevent vertical or longitudinal movement of planting spike 402 within planting rack 404.

Figure 5:
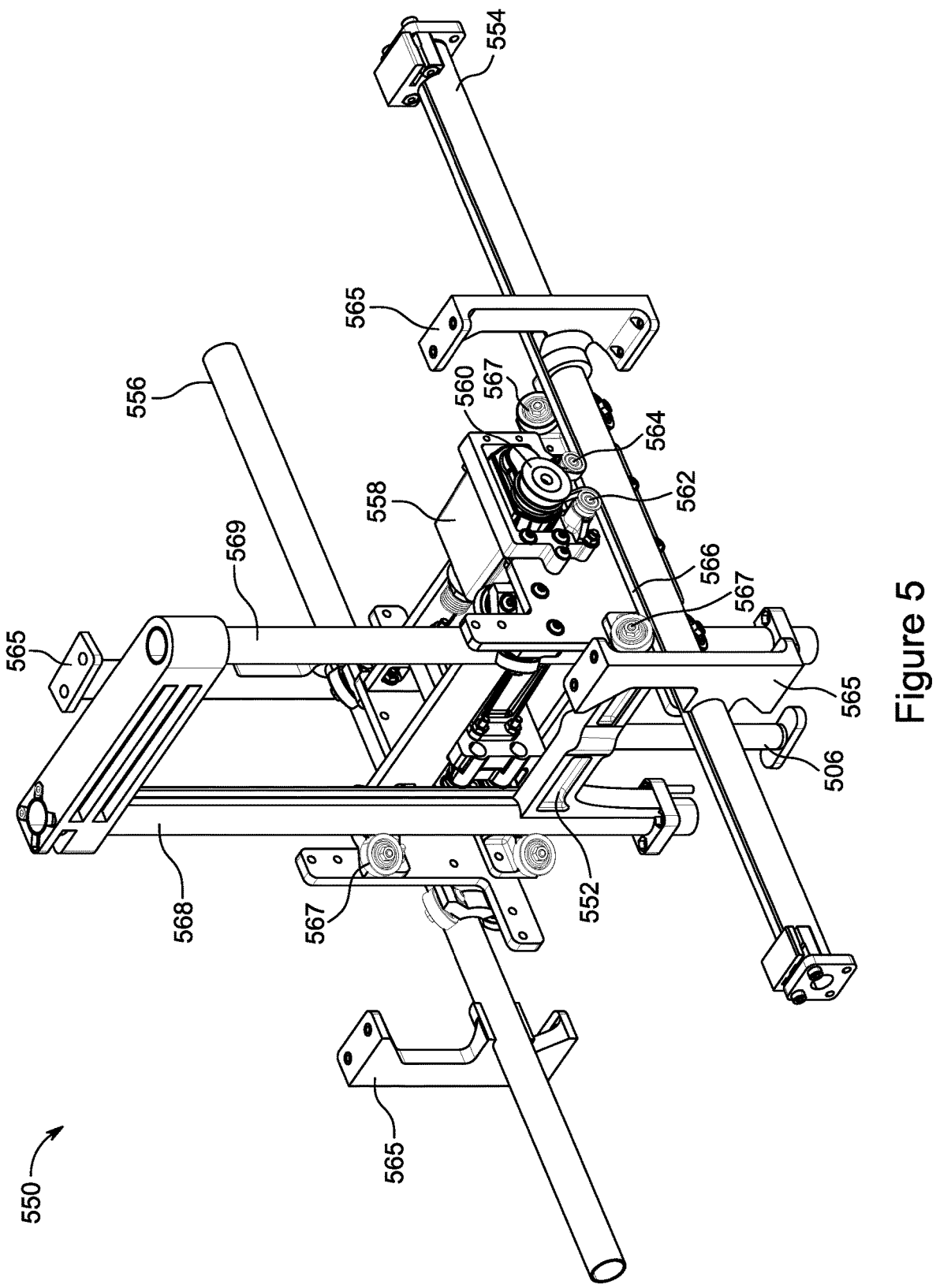
FIG. 5 shows a perspective view of a pushing rod gantry subassembly, according to one embodiment of the present arrangements, for moving a pushing rod laterally and/or longitudinally.

FIG. 5 shows a pushing rod gantry subassembly 550, according to one embodiment of the present arrangements, for maneuvering a pushing rod 506 laterally or horizontally (i.e., along an x-axis),) and/or longitudinally or vertically (i.e., along a z-axis). Pushing rod 506 is substantially similar to pushing rod 106 of FIG. 1. Lateral movement of pushing rod 506 along a length of a planting rack (e.g., planting rack 104 of FIG. 1) aligns pushing rod 506 with a planting spike (e.g., planting spike 102 of FIG. 1) loaded within the planting rack. The longitudinal movement of pushing rod 506, between a retracted position and an extended position, pushes the planting spike from the planting rack into the sub-aquatic substrate.

To enable movement of pushing rod 506 in the lateral direction (i.e., along the x-axis), pushing rod gantry subassembly 550 includes a pushing rod gantry 552 coupled to a lateral linear actuator. The lateral linear actuator may be any component that moves pushing rod gantry 552 laterally. In one embodiment of the present arrangements, the lateral linear actuator is a linear belt drive that includes a lateral belt pulley 560 movably coupled to a belt 566.

As shown in FIG. 5, pushing rod gantry 552 is disposed between and movably coupled to a first lateral rod 554 and second lateral rod 556. Pushing rod gantry 552 includes a motor 558 that is rotatably coupled to lateral belt pulley 560, which has a teeth pattern defined around a perimeter of lateral belt pulley 560. Belt 566, having a teeth pattern defined thereon that matches the teeth pattern of lateral belt pulley 560, extends from a first lateral rod end and a second rod end. Between the first lateral rod end and the second lateral rod end, belt 566 travels under a first alignment pulley 662, around lateral belt pulley 560, and under a second alignment pulley 664. First alignment pulley 662 and second alignment pulley 664 ensure that belt 566 remains in lateral alignment with first lateral rod 554 except for a portion of belt 566, between first alignment pulley 662 and second alignment pulley 664, that wraps around lateral belt pulley 560. One or more gantry mounts 565 mount pushing rod gantry 552 to a sub-aquatic planter, for example, a sled or ROV.

In one embedment of the present arrangements, pushing rod gantry 552 includes one or more wheels 567 that rotatably contact first lateral rod 554 and/or second lateral rod 556 to align and/or guide pushing rod gantry 552 traversing along first lateral rod 554 and/or second lateral rod 556. In a preferred embodiment of the present arrangements, first lateral rod 554 and second lateral rod 556 each include two sets of wheels 567. Each set of wheels 567 contacts an opposing surface (i.e., a top surface and a bottom surface) of first lateral rod 554 or second lateral rod 556, respectively.

When motor 558 induces lateral belt pulley 560 to rotate, the teeth of lateral belt pulley 560 engage with the teeth pattern of belt 566, causing rotating lateral belt pulley 560 to traverse along a length of belt 566. Rotation of lateral belt pulley 560 along a length of belt 566 moves pushing rod gantry 552 to move along first lateral rod 554 and second lateral rod 556 in a lateral direction.

To enable movement of pushing rod 506 in the longitudinal direction (i.e., along a z-axis), pushing rod gantry 552 is coupled to a longitudinal linear actuator. In one embodiment of the present arrangements, the longitudinal linear actuator is a linear belt drive that includes a longitudinal belt pulley and a longitudinal belt that is substantially similar to lateral belt pulley 560 and a belt 566, described above.

Pushing rod gantry 552 is disposed between and movably coupled to a first longitudinal rod 568 and second longitudinal rod 569. The longitudinal belt extends along a length of a first longitudinal rod 568 or second longitudinal rod 569. Pushing rod gantry 552 includes a second motor (not shown for ease of illustration) that is rotatably coupled to the longitudinal belt pulley.

When the second motor induces the longitudinal belt pulley to rotate, the teeth of the longitudinal belt pulley engage with a teeth pattern of the longitudinal belt, causing the longitudinal belt pulley to traverse along a length of the longitudinal belt. Rotation of the longitudinal belt pulley along a length of the longitudinal belt moves first longitudinal rod 568 and second longitudinal rod 569 in a longitudinal direction. Movement of first longitudinal rod 568 and second longitudinal rod 569 in a longitudinal direction move pushing rod 506 between a retracted position and an extended position.

In another embodiment of the present arrangements, multiple planting racks are positioned parallel with each other, and pushing rod 106 is coupled to a gantry system with three axes of movement. In addition to the two axes of movement described above, pushing rod gantry 552 is capable of moving pushing rod 106 from one planting rack to another planting rack (e.g., the y-axis). The gantry system is substantially similar to the gantry system described above and includes a third lateral rod and a fourth lateral rod coupled to the pushing rod. The third lateral rod and the fourth lateral rod are perpendicular to one or more of the planting racks. A second lateral linear actuator, for example, a linear belt drive described above is coupled to the third lateral rod and/or the fourth lateral rod to induce the gantry system to move laterally or horizontally, such that the pushing rod also moves laterally or horizontally from one of the planting racks to another planting rack.

Figure 6:
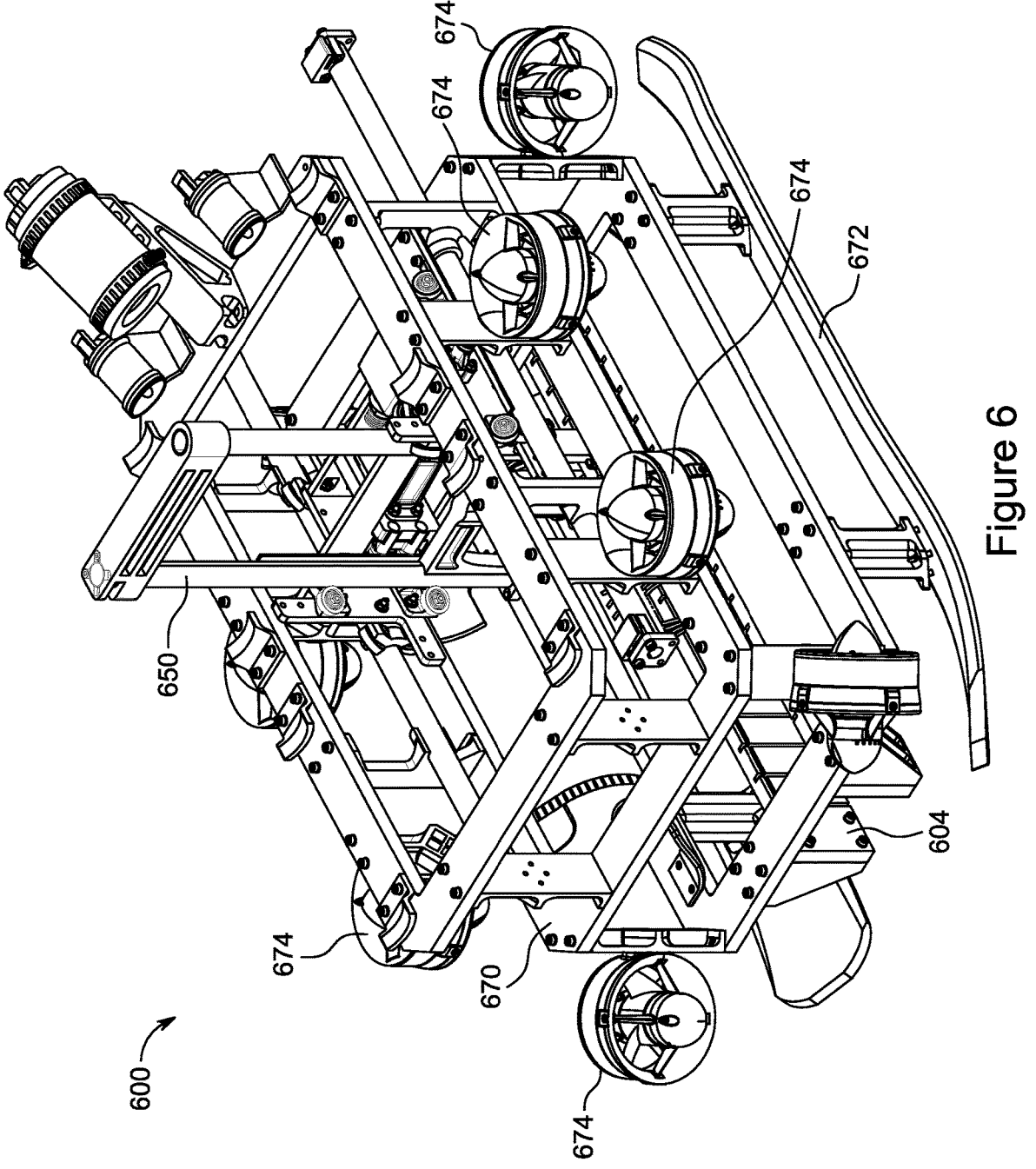
FIG. 6 shows a perspective view of a sub-aquatic planter, according to one of the present arrangements, that houses a seagrass planting system of FIG. 1.

FIG. 6 shows a seagrass planting system 600, according to one embodiment of the present arrangements, secured to a sub-aquatic planter. Seagrass planting system 600 is substantially similar to seagrass planting system 100 of FIG. 1. The sub-aquatic planter may be any apparatus that houses seagrass planting system 600, such as ROV 670. One or more fasteners 676 secure seagrass planting system 600 to ROV 670. By way of example, one or more fasteners 676 fasten one or more gantry mounts (e.g., one or more gantry mounts 565 of FIG. 5) to ROV 670 to mount a pushing rod gantry (e.g., pushing rod gantry 552 of FIG. 5) within ROV 670. One or more fasteners 676, in one embodiment of the present arrangements, secures one or more planting racks 604 to ROV 670.

ROV may include additional components to aid in planting seagrass in the sub-aquatic environment. ROV 670, in one aspect of the present arrangements, includes one or skis to assist in maneuvering over a substrate. ROV 670, in another aspect of the present arrangements, includes one or more propulsion systems 674 to control pitch, roll, and yaw, as well as movement in a lateral and longitudinal direction.

The present teachings offer, among other things, different methods for planting a seagrass segment into a sub-aquatic substrate. FIG. 7 shows a method for planting a seagrass segment into a sub-aquatic substrate, according to one embodiment of the present teachings. Method 700 begins with a step 702, which includes obtaining a seagrass segment. In one embodiment of the present teachings, the seagrass segment includes a rhizome that extends horizontally and a leaf structure that extends vertically from one or more nodes of the rhizome.

A step 704 includes securing the seagrass segments to a planting spike (e.g., planting spike 102 of FIG. 1), using a seagrass securing mechanism (e.g., seagrass securing mechanism 218 of FIG. 2) located on the planting spike, to produce a prepared planting spike. The seagrass securing mechanism, in one embodiment of the present teachings, includes one or more securing tangs (e.g., one or more securing tangs 338 of FIG. 3) for securing the seagrass segment to the planting spike.

Step 704, in one embodiment of the present arrangements, includes a sub-step of positioning a portion of the seagrass segment (e.g., the rhizome) between the planting spike and the securing tang. Another sub-step includes pushing and bending the securing tang towards the planting spike until the seagrass segment is secured between the planting spike and the securing tang. The positioning sub-step and pushing sub-step are carried out for each securing tang.

In another embodiment of the present teachings, the seagrass securing mechanism includes a first extending arm (e.g., first extending arm 222 of FIG. 2), a first banding element (e.g., first banding element 223 FIG. 2), a second extending arm (e.g., second extending arm 224 of FIG. 2), and a second banding element (e.g., second banding element 225 FIG. 2). Step 704 further includes a sub-step of positioning a first portion of the seagrass segment (e.g., the rhizome) adjacent to the first extending arm and second portion of the seagrass segment adjacent to the second extending arm. Another sub-step includes wrapping the first banding element around the first extending arm and the first portion of the seagrass segment to secure the first portion of the seagrass segment to the planting spike. Yet another sub-step includes wrapping the second banding element around the second extending arm and the second portion of the seagrass segment to secure the second portion of the seagrass segment to the planting spike.

Next, a step 706 includes loading the prepared planting spike into a planting rack (e.g., planting rack 104 of FIG. 1). The prepared planting spike is disposed between and contacts a first rail (e.g., first rail 105 of FIG. 1) of the planting rack and a second rail (e.g., second rail 107 of FIG. 1) of the planting rack.

As discussed above, in one embodiment of the present teaching, the planting spike includes a first alignment edge (e.g., first alignment edge 230 of FIG. 2) and a second alignment edge (e.g., second alignment edge 232 of FIG. 2), the first rail includes a first rail slot (e.g., first rail slot 440 of FIG. 4) and the second rail includes a corresponding second rail slot. Step 706, in one embodiment of the present teachings, includes a sub-step of disposing the first alignment edge within the first rail slot and disposing the second alignment edge within the second rail slot.

In another embodiment of the present arrangements, the planting spike includes a first engaging end (e.g., first engaging end 234 of FIG. 2) and a second engaging end (e.g., a second engaging end 236 of FIG. 2), the first rail includes a first rail recession (e.g., a first rail recession 446 of FIG. 4), and the second rail includes a second rail recession. Step 706, in one embodiment of the present teachings, includes a sub-step that includes disposing the first engaging end within the first rail recession and disposing the second engaging end within the second rail recession.

Following step 706, a step 708 is implemented and includes positioning the planting rack over a planting location. The planting rack, in one embodiment of the present teaching, is coupled to a sub-aquatic planter that can move from one location to another location, either by its propulsion system (e.g., one or more propellers or thrusters) or by the propulsion of a coupled vehicle (e.g., the sub-aquatic planter tethered to a boat).

Next, a step 710 includes locating a pushing rod (e.g., pushing rod 106 of FIG. 1) above the prepared planting spike. A pushing rod gantry (e.g., pushing rod gantry 552 of FIG. 5), in one embodiment of the present teachings, moves the pushing rod to a location above the prepared planting spike. As explained above, the pushing rod gantry includes a linear actuator to move the pushing rod along the length of the planting rack to the location of the planting spike.

A step 712 includes moving the pushing rod from a retracted position to an extended position thereby pushing the prepared planting spike from the planting rack into the sub-aquatic substrate. As discussed above, in one embodiment of the present teachings, the planting spike includes a force receiving feature (e.g., force receiving feature 214 of FIG. 2). The pushing rod, during movement from the retracted position to the extended position, applies a pushing force against the force receiving feature. The pushing force pushes, in one embodiment of the present teachings, the first engaging end of the planting spike out of the first rail recession and the second engaging end of the planting spike out of the second rail recession.

In another embodiment of the present teachings, a converging portion (e.g., converging portion 221 of FIG. 2) of the planting spike engages with the sub-aquatic substrate while the first alignment edge and the second alignment edge of the planting spike remain disposed within the first rail slot and the second rail slot, respectively. Thus, the planting spike remains in an aligned position to receive the pushing force from the pushing rod.

The present teachings recognize that the planting rack, in one embodiment, may be loaded with multiple prepared planting spikes. Thus, step 702, step 704, and step 706 may be repeated to load the planting rack with multiple prepared planting spikes. Moreover, locating step 710 includes locating the pushing rod from one position above a prepared planting spike, loaded within the planting rack, to another position above another prepared planting spike loaded within the planting rack.

The present teachings also recognize that multiple planting racks may be used and one planting rack may be positioned adjacent another planting rack. By way of example, multiple planting racks are secured to a sub-aquatic planter. In this embodiment of the present teachings, locating step 710 further includes moving the pushing rod from a position above a planting rack to a position above another planting rack. As discussed above regarding FIG. 5, the pushing rod gantry includes a linear actuator to move the pushing rod linearly from above the planting rack to another planting rack.

Although illustrative embodiments of the arrangements and teachings have been shown and described, other modifications, changes, and substitutions are intended. Accordingly, it is appropriate that the disclosure be construed broadly.

What is claimed is:

1. A seagrass planting system comprising:
  a planting spike including:
    a tine end feature having a converging portion and a base portion having disposed thereon a seagrass securing mechanism for securing a seagrass segment, wherein said converging portion is designed to penetrate a sub-aquatic substrate;
    an alignment guide feature extending from said base portion, spanning from a first end to second end, and including a first alignment edge and a second alignment edge disposed on an area located between said first end and said second end, wherein said first end extends an extending distance away said base portion and said first alignment edge and said second alignment edge are designed to align said planting spike within a planting rack; and
    a force receiving feature extending at an angle relative to said second end and designed to receive a pushing force to push said planting spike from said planting rack into said sub-aquatic substrate.

2. The seagrass planting system of claim 1, wherein said seagrass securing mechanism includes one or more securing tangs extending away from said base portion such that when a seagrass segment is disposed between each of said securing tangs and said base portion and each of said securing tangs is bent towards said base portion, said seagrass segment is secured to said securing tang.

3. The seagrass planting system of claim 1, wherein said seagrass securing mechanism includes a first extending arm, extending from a first base portion side, a second extending arm, extending from a second base portion side, a first banding element, and a second banding element, wherein said first banding element is wrapped around said first extending arm to secure a portion of said seagrass segment to said first extending arm and said second banding element is wrapped around said second extending arm to secure another portion of said seagrass segment to said second extending arm.

4. The seagrass planting system of claim 1, wherein said alignment guide feature is substantially parallel with said tine end feature and said extending distance between said base portion and said first end ranges from between about 1 mm to about 10 mm.

5. The seagrass planting system of claim 1, wherein said planting spike is produced from a single piece of material.

6. The seagrass planting system of claim 1, wherein said planting spike is made from a material that corrodes when said material is exposed to saltwater and is selected from at least one material selected from a group comprising biodegradable plastic, steel, aluminum, plants, plastic, and fungi.

7. The seagrass planting system of claim 1, wherein said force receiving feature extends ninety degrees relative to said second end.

8. The seagrass planting system of claim 1, wherein said force receiving feature includes a first engaging end and a second engaging end.

9. The seagrass planting system of claim 1, further comprising a pushing rod that moves between a retracted position and an extended position, such that, when said pushing rod is located above said planting spike, said pushing rod, when moving from said retracted position to said extended position, contacts said force receiving feature of said planting spike and pushes at least a portion of said planting spike into said sub-aquatic substrate.

10. The seagrass planting system of claim 9, further comprising:
  a first longitudinal rod and a second longitudinal rod coupled to said pushing rod, wherein said first longitudinal rod and said second longitudinal rod are parallel with said pushing rod; and
  a longitudinal linear actuator, coupled to said first longitudinal rod and/or said second longitudinal rod, to induce said first longitudinal rod and said second longitudinal rod to move vertically, such that said pushing rod moves longitudinally between said retracted position and said extended position.

11. The seagrass planting system of claim 10, wherein:
  said longitudinal linear actuator comprises a motor, a longitudinal belt pulley having teeth defined around a circumference of said longitudinal belt pulley, and a belt having a belt teeth pattern that matches said teeth of said longitudinal belt pulley, wherein said motor is coupled to said longitudinal belt pulley, said longitudinal belt pulley is engaged with said belt extending from a first rod end to a second rod end of said first longitudinal rod and/or said second longitudinal rod; and
  wherein, when said motor induces said longitudinal belt pulley to rotate, said teeth of said longitudinal belt pulley engage with said belt teeth pattern causing first longitudinal rod and said second longitudinal rod to move vertically thereby causing said pushing rod to move between said retracted position and said extended position.

12. The seagrass planting system of claim 9, further comprising:
  a first lateral rod and a second lateral rod coupled to said pushing rod, wherein said first lateral rod and said second lateral rod are perpendicular to said pushing rod and parallel to said planting rack; and a lateral linear actuator, coupled to said first lateral rod and/or said second lateral rod, to induce said first lateral rod and said second lateral rod to move horizontally, such that said pushing rod moves laterally along a length said planting rack.

13. The seagrass planting system of claim 9, further comprising one or more planting racks, each of said planting racks capable of holding one or more of said planting spikes, each of said planting racks further including:
  a first rail having one or more first rail slots receding from an internal first rail sidewall into said first rail and extending from a first rail top surface to a first rail bottom surface and a first rail recession, proximate to said first rail top surface, extending from a first rail end to a second rail end;
  a second rail having one or more second rail slots receding from an internal second rail sidewall into said second rail and extending from a second rail top surface to a second rail bottom surface, and a second rail recession, proximate to said second rail top surface, extending from a first rail end to a second rail end;
  wherein each of one or more of said first rail slots is aligned with a corresponding one or more of said second rail slots and said second rail recession is aligned with said first rail recession; and
  wherein, when said planting spike is installed within said planting rack, said first alignment edge of said planting spike is disposed within one of one or more of said first rail slots, said second alignment edge is disposed within said corresponding one of one or more of said second rail slots to inhibit or reduce lateral movement of said planting spike within said planting rack and said first engaging end of said planting spike is disposed within said first rail recession and a second engaging end of said planting spike is disposed within said corresponding second rail recession to inhibit or reduce movement of said planting spike in a vertical or longitudinal direction.

14. The seagrass planting system of claim 13, wherein a width of said force receiving feature, between said first engaging end and said second engaging end, is greater than a width between said an internal first rail sidewall and said internal second rail sidewall.

15. The seagrass planting system of claim 13, wherein each of said planting racks is parallel to an adjacent planting rack.

16. The seagrass planting system of claim 13, further comprising:
  a third lateral rod and a lateral rod coupled to said pushing rod, wherein said first lateral rod and said second lateral rod is perpendicular to one or more of said planting racks; and
  a second lateral linear actuator, coupled to said third lateral rod and/or said fourth lateral rod, to induce said pushing rod to move horizontally along at least a portion of a length of said third lateral rod and/or said fourth lateral rod such that said pushing rod moves from above one of said planting racks to another of said planting racks.

17. A method of planting a seagrass segment comprising:
  obtaining a seagrass segment;
  securing, using a seagrass securing mechanism, said seagrass segment to a planting spike to produce a prepared planting spike;
  loading said prepared planting spike into a planting rack such that said prepared planting spike is disposed between and contacts a first rail of said planting rack and a second rail of said planting rack;

positioning said planting rack over a planting location;

locating a pushing rod above said prepared planting spike; and moving said pushing rod from a retracted position to an extended position thereby pushing said prepared planting spike from said planting rack into a sub-aquatic substrate.

18. The method of planting said seagrass segment of claim 17, wherein said loading said prepared planting spike into said planting rack further includes:

positioning a first alignment edge of said planting spike within a first rail slot of a first rail and a second alignment of said planting spike within a second rail slot of a second rail; and positioning a first engaging end of said planting spike within a first rail recession of said first rail and a second engaging end of said planting spike within a second rail recession of said second rail.

19. The method of planting said seagrass segment of claim 17, further comprising securing one or more planting racks to a sub-aquatic vehicle.

20. The method of planting said seagrass segment of claim 18, where said locating said pushing rod above said prepared planting spike includes moving said pushing rod from above one of said planting racks to above another of said planting racks.

* * * * *